United States Patent
Iwamoto et al.

(10) Patent No.: US 7,628,540 B2
(45) Date of Patent: Dec. 8, 2009

(54) BEARING DEVICE FOR WHEEL

(75) Inventors: Kenichi Iwamoto, Iwata (JP); Takayoshi Ozaki, Iwata (JP); Takashi Koike, Iwata (JP)

(73) Assignee: NTN Corporation, Osaka (JP)

( * ) Notice: Subject to any disclaimer, the term of this patent is extended or adjusted under 35 U.S.C. 154(b) by 472 days.

(21) Appl. No.: 11/523,067

(22) Filed: Sep. 19, 2006

(65) Prior Publication Data

US 2007/0014500 A1 Jan. 18, 2007

Related U.S. Application Data

(63) Continuation-in-part of application No. 10/589,624, filed as application No. PCT/JP2005/001824 on Feb. 8, 2005.

(30) Foreign Application Priority Data

Feb. 18, 2004 (JP) .............................. 2004-041048

(51) Int. Cl.
*F16C 13/02* (2006.01)
*G01D 1/00* (2006.01)
(52) U.S. Cl. ..................... 384/448; 384/544; 73/862.53
(58) Field of Classification Search ................. 384/448, 384/537, 544, 624; 73/593, 864.322, 862.627, 73/862.49, 862.541, 862.53; 324/160; 29/898.062, 29/898.07, 894.361
See application file for complete search history.

(56) References Cited

U.S. PATENT DOCUMENTS

| | | | | |
|---|---|---|---|---|
| 4,203,319 A | * | 5/1980 | Lechler | ................. 73/862.541 |
| 5,140,849 A | * | 8/1992 | Fujita et al. | .................... 73/593 |
| 5,488,871 A | | 2/1996 | Harbottle et al. | |
| 5,503,030 A | * | 4/1996 | Bankestrom | ........... 73/862.627 |
| 5,911,458 A | * | 6/1999 | Bywalez et al. | ........ 29/898.062 |
| 5,952,587 A | * | 9/1999 | Rhodes et al. | ......... 73/862.541 |
| 6,002,248 A | * | 12/1999 | Binder | ....................... 324/160 |

(Continued)

FOREIGN PATENT DOCUMENTS

GB 2310288 A * 8/1997

(Continued)

OTHER PUBLICATIONS

Japanese Office Action issued on Dec. 16, 2008 in correponding Japanese Patent Application 2004-221513.

(Continued)

*Primary Examiner*—Marcus Charles (57) ABSTRACT

A bearing device for a wheel, where preload control is easy and a uniform amount of preload can be applied even if a bearing seal is installed in the bearing device. The bearing device rotatably supports a wheel and has an outer member 1, an inner member 2, and rolling elements 3 interposed between both members. The outer member 1 has on its outer periphery a vehicle body installation flange 1$a$, and double row rolling surfaces 6, 7 are formed on the inner peripheries of the outer member. Rolling surfaces 8, 9 facing the rolling surfaces 6, 7 of the outer member 1 are formed in the inner member 2. Between the rolling surfaces of both members 1, 2 are interposed the rolling elements 3. A sensor 4 for detecting the amount of preload of the bearing is provided on either the outer member 1 or the inner member 2.

11 Claims, 8 Drawing Sheets

U.S. PATENT DOCUMENTS

| | | | | |
|---|---|---|---|---|
| 6,471,407 | B1 * | 10/2002 | Katano | 384/448 |
| 6,490,935 | B1 * | 12/2002 | Joki et al. | 73/862.49 |
| 6,574,865 | B2 * | 6/2003 | Meeker et al. | 384/544 |
| 6,802,208 | B2 * | 10/2004 | Chinitz et al. | 73/115.07 |
| RE39,838 | E * | 9/2007 | McDearmon | 73/862.55 |
| 7,444,888 | B2 * | 11/2008 | Mol et al. | 73/862.322 |
| 2003/0072511 | A1 | 4/2003 | Toda et al. | |
| 2005/0169563 | A1 | 8/2005 | Inoue et al. | |

FOREIGN PATENT DOCUMENTS

| | | | | |
|---|---|---|---|---|
| JP | 01112019 | A * | 4/1989 | |
| JP | 07-332360 | | 12/1995 | |
| JP | 08-25106 | | 1/1996 | |
| JP | 08110285 | A * | 4/1996 | |
| JP | 11-044319 | | 2/1999 | |
| JP | 2001-033322 | | 2/2001 | |
| JP | 2001-045614 | | 2/2001 | |
| JP | 2001-200841 | | 7/2001 | |
| JP | 2002-206557 | | 7/2002 | |
| JP | 2002-213438 | | 7/2002 | |
| JP | 2002-292503 | | 10/2002 | |
| JP | 2003-4593 | | 1/2003 | |
| JP | 2003-74548 | | 3/2003 | |
| JP | 2003120666 | A * | 4/2003 | |
| JP | 2003-194073 | | 7/2003 | |
| JP | 2004-45370 | | 2/2004 | |
| JP | 2004361259 | A * | 12/2004 | |
| WO | WO 2004048913 | A1 * | 6/2004 | |
| WO | WO 2004099747 | A1 * | 11/2004 | |

OTHER PUBLICATIONS

Supplementary European Search Report, mailed Apr. 20, 2007 and issued in corresponding European Patent Application No. 05709876.6-2424.

International Search Report, dated May 17, 2005.

U.S. Appl. No. 10/589,624, filed Aug. 16, 2006, Kenichi Iwamoto et al., NTN Corporation.

* cited by examiner

Fig.1

Preload Amount Determining Unit — 30

BEARING DEVICE FOR WHEEL

CROSS REFERENCE TO RELATED APPLICATIONS

The present application is a continuation-in-part of U.S. application Ser. No. 10/589,624, filed Aug. 16, 2006, and claims the benefit of U.S. patent application Ser. No. 10/589,202, filed Aug. 11, 2006, PCT International Application Number PCT/JP2005/001824, filed Feb. 8, 2005, and Japanese Application No. 2004-041048, filed Feb. 18, 2004, the disclosures of which are incorporated herein by reference.

BACKGROUND OF THE INVENTION

1. Field of the Invention

The present invention relates to a bearing device for a wheel, which is used in an automotive vehicle and is preloaded.

2. Description of the Prior Art

The bearing device for the wheel is rendered to be a double row rolling bearing in the form of an angular contact ball bearing or a tapered roller bearing and is applied a preload. As a method of controlling the application of a preload in the standard double row rolling bearing of a kind used in a spindle motor or a disc drive device for an information processing equipment, the method is known in which the preload control is carried out with a revolution torque. (See, for example, the Japanese Laid-open Patent Publication No. 2003-74548 published Mar. 12, 2003.)

However, since the above described preload application control method is a method, in which while a predetermined rotational torque is continuously applied to the bearing, the application of the preload is interrupted when the number of revolution of the bearing attains a target number of revolution, an equipment for the preload control tends to become bulky where it is applied to a relatively large bearing such as, for example, a bearing device for an automobile wheel. Also, in order to eliminate influences on the torque control brought about by bearing seals, the bearing seals have to be assembled after the preload has been applied, resulting in complication of the assembling work. Moreover, since there is no bearing seal during the preload being applied, there is the possibility that dusts and grits may enter in the bearing.

SUMMARY OF THE INVENTION

An object of the present invention is to provide a bearing device for a wheel, in which the preload control can be easily executed, a uniform amount of preload can be applied even though a bearing seal has been installed in the bearing device, the bearing rigidity and rotational torque of the individual bearing device can be kept uniform and stabilization of the quality can be attained.

The bearing device for the wheel according to the present invention is a bearing device for a wheel, including an outer member having an inner peripheral surface formed with a plurality of rows of rolling surfaces or raceways, an inner member formed with rolling surfaces opposed to the rolling surfaces of the outer member, and a plurality of rows of rolling elements interposed between the opposed rolling surfaces and is used for rotatably supporting a vehicle wheel relative to a vehicle body, in which either the outer member or the inner member is provided with a sensor for detecting the amount of preload in the bearing.

According to this construction, since the sensor for detecting the amount of preload of the bearing is provided on either the outer member or the inner member, the preload can be applied to the bearing while a signal from the sensor is monitored. For this reason, even though the preload is applied in a condition with a sealing member mounted, variation of the amount of the preload is minimum and the bearing rigidity and the rotational torque of the individual bearing can be kept uniform and the quality is stabilized. Also, since the preload can be applied while the sealing member is incorporated, assemblage of the bearing can be facilitated and ingress of dusts and grits into the bearing is prevented during the application of the preload.

The sensor for detecting the amount of the preload of the bearing may be a piezoelectric element, a strain gauge or a magnetostrictive element. In the case of the piezoelectric element, the strain gauge or the magnetostrictive element, mounting onto the bearing at a low price is possible. Because of this, the use may be dedicated to the preload control during the application of the preload and it may be rendered to be disposable.

In the present invention, the sensor for detecting the amount of preload of the bearing may comprise a thin film printed directly on a member of one of the outer and inner members.

When the sensor referred to above comprises the thin film formed directly on one of the outer and inner members by means of a printing technique, no work of mounting the sensor is required, facilitating assemblage of the bearing and the sensor can be provided at a low price.

In the present invention, the inner member may include a hub axle and an inner race mounted on an outer periphery of the hub axle, in which the inner race is fixed on the hub axle by means of a crimped portion formed by crimping or staking an inboard end of the hub axle and in which the preload of the bearing may be applied by this crimping to form the crimped portion.

In the case of this construction, a crimping work to form the crimped portion concurrently serves as a work of applying the preload. At this time, by controlling a detection signal outputted from the sensor in response to a load acting on the sensor, the amount of preload of the bearing can be precisely set.

In the present invention, the bearing for the wheel is so assembled as to attain a predetermined preload by utilization of the signal from the sensor referred to above.

In the present invention, the inner member includes a hub axle and an inner race mounted on an outer periphery of the hub axle and fixed in position on the hub axle by means of a crimpled portion formed by crimping an inboard end of the hub axle. The preload of the bearing is applied as a result of the crimping to form the crimped portion. The sensor referred to above may be a winding type coil fitted to the outer member and capable of detecting one or both of an amount of radial displacement of an outer diametric surface of the inner race and a change of a magnetoresistance resulting from a stress acting on the inner race.

When the crimped portion is formed by means of, for example, an orbital forging, the inner race expands radially in proportion to the amount of crimping and the hoop stress develops. Accordingly, if the sensor for detecting the amount of displacement or change in magnetoresistance is disposed in face-to-face relation with an outer diametric surface of the inner race radial expansion or hoop stress of the inner race can be detected by the sensor. Accordingly, the preload can be controlled with the sensor output.

In the case of this construction, the sensor referred to above may be removably fitted to the outer member so that this sensor may be fitted to the outer member during assemblage of the bearing assembly, but may be removed from the outer member during use of the bearing assembly.

If the sensor is removed after the crimping, the removed sensor can be used for the crimping to be carried out in connection with a different wheel support bearing assembly and can be produced inexpensively. In such case, if the sensor is set by the utilization of a seal fitting area of the outer member, there is no need to prepare a space for installation of the sensor in the bearing assembly. Also, since the inner race is detected directly by the sensor, there is no need to provide the bearing device for the wheel with a special member dedicated for detection.

A method of assembling a bearing device for a wheel according to the present invention is applied where in the bearing device for the wheel of the structure, in which as hereinabove described, the inner race is mounted on the hub axle and is fixed to the hub axle by means of the crimped portion at the inboard end of the hub axle, the crimping of the hub axle is performed by the orbital forging. This assembling method is characterized by including processing a signal from the sensor continuously or discretely during the orbital forging and terminating the orbital forging at the moment a preset target signal value is attained.

If the bearing preload is applied by means of the orbital forging while the sensor output is monitored, variation of the amount of the preload of the bearing can be eliminated, the bearing rigidity and the rotational torque of the individual bearing assembly can be rendered constant and the quality can be stabilized.

In this assembling method, after the press-fitting of the inner race onto the hub axle, but before the crimping being effected, a starting torque, a natural frequency or a rigidity of the bearing device for the wheel may be measured so that based on this measurement, the preset target signal value for the crimping can be determined.

Considering that dimensional measurement of individual component parts involves errors, the amount of preload at the time the inner race is press-fitted onto the hub axle changes considerably as the errors accumulates. Also, the change in amount of preload applied as a result of the orbital forging has a variation. Accordingly, if after the press-fitting, measurement of one of the bearing rigidity, the starting torque and the natural frequency is made and a deviation from the target value is fed back to the amount of orbital forging, it is possible to counterbalance the variation of the amount of preload resulting from the press-fitting, thereby preventing the variation in preload during the press-fitting from being left over to the subsequent process step.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A first preferred embodiment of the present invention will be described with particular reference to FIGS. 1 to 3. This embodiment is directed to a third generation, inner race rotating type and is applied to a bearing device for the support of a driven wheel.

Figure 1:
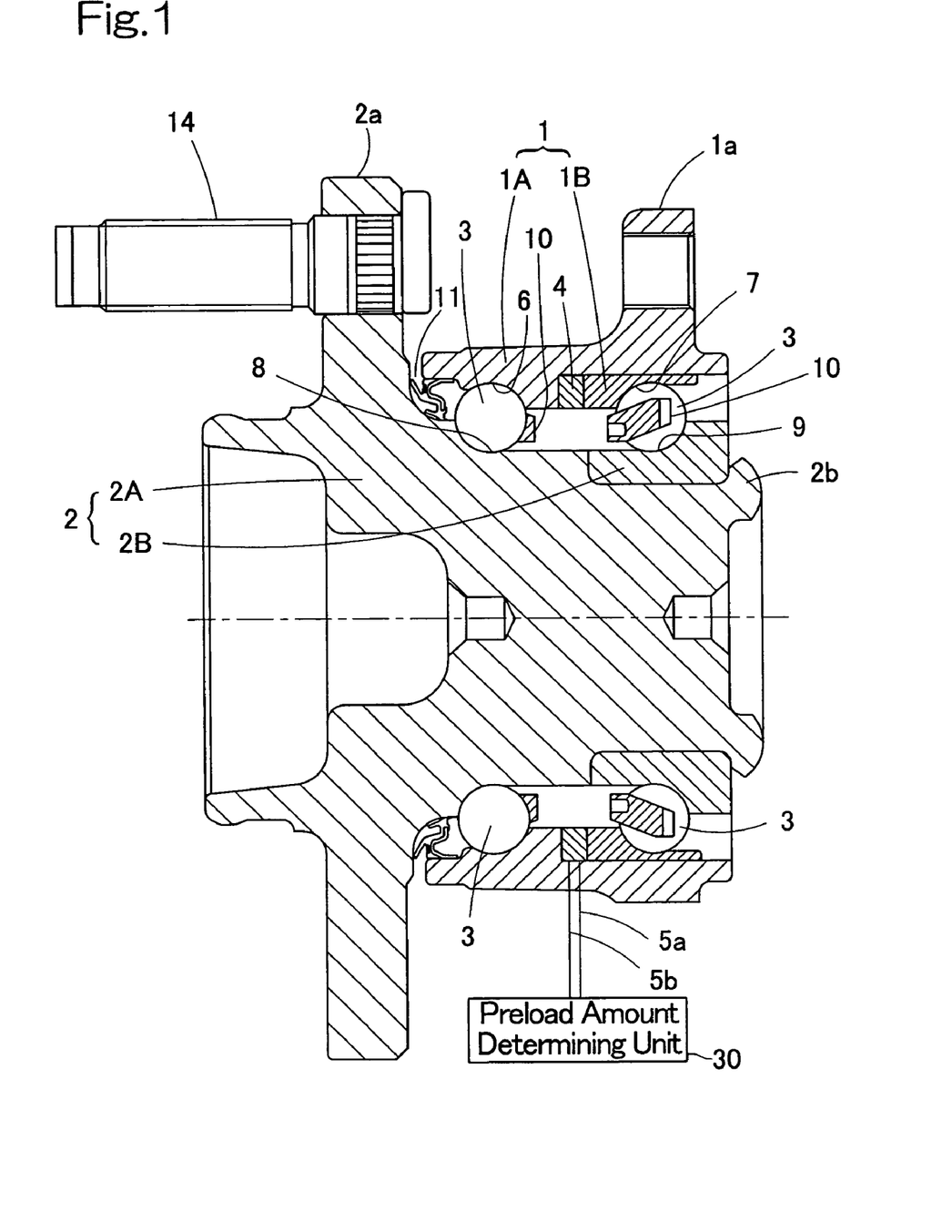
FIG. 1 is a longitudinal sectional view of a bearing device for a wheel according to a first preferred embodiment of the present invention.
Figure 2:
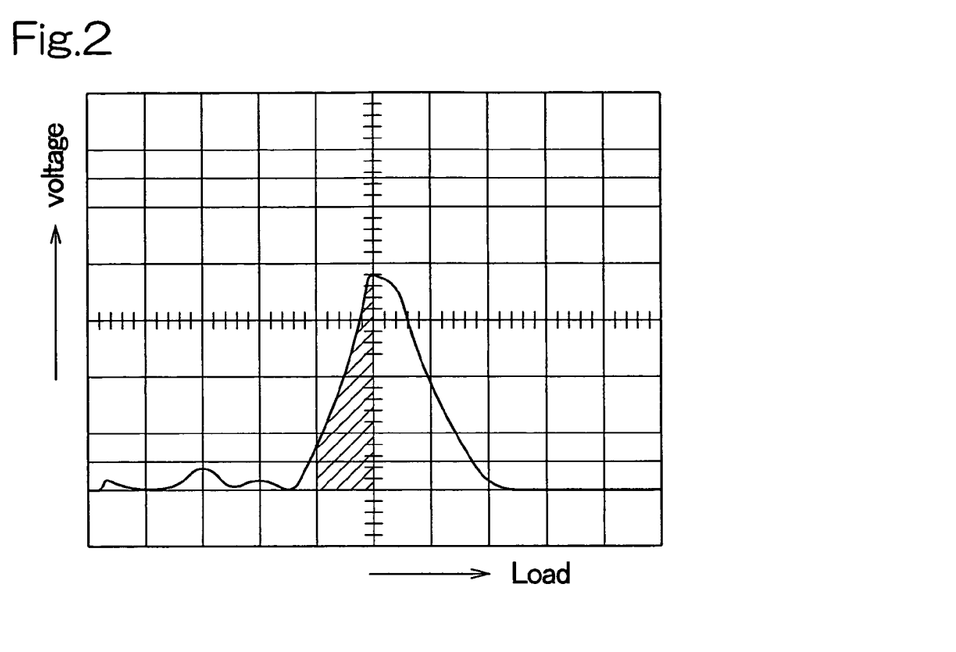
FIG. 2 is a chart showing the waveform of an output voltage of a piezoelectric element provided in the bearing device for the wheel shown in FIG. 1 as a sensor.

As shown in FIG. 1, this bearing device for the wheel includes an outer member 1 having an inner periphery formed with double rows of rolling surfaces 6 and 7, an inner member 2 having rolling surfaces 8 and 9 opposed to the rolling surfaces 6 and 7, respectively, and double rows of rolling elements 3 interposed between the rolling surfaces 6 and 8 and between the rolling surfaces 7 and 9, respectively. The outer member 1 is fitted at one end to a knuckle (not shown) of a vehicle body through a vehicle body installation flange 1a.

The inner member 2 has a wheel mounting flange 2a and the wheel (not shown) is fitted to this wheel mounting flange 2a through a plurality of bolts 14. This bearing device for the wheel is rendered to be a double row angular contact ball bearing and the rolling surfaces 6 to 9 represent an arcuate sectional shape with their contact angles held in back-to-back relation with each other. The rolling elements 3 are in the form of a ball and are retained by a retainer 10 employed for each row. At a location outside of the row of the rolling elements 3 on the outboard side, an annular space delimited between the outer member 1 and the inner member 2 are sealed by a sealing member 11.

It is to be noted that the term "outboard" is intended to speak of an outer side of the widthwise direction of the vehicle body while this bearing device for the wheel is mounted on the automotive vehicle and the term "inboard" is intended to speak of an inner or a center side of the widthwise direction of the vehicle body.

The outer member 1 serves as a stationary member and includes an outer member body 1A having the vehicle body installation flange 1a and an outer race 1B mounted on an inner periphery of an inboard end of the outer member body 1A. The rolling surfaces 6 and 7 of each row are formed in the outer member body 1A and the outer race 1B, respectively. A ring-shaped sensor 4 for detecting the amount of preload of the bearing acting in an axial direction is provided between the outer member body 1A and the outer race 1B. The sensor 4 is in the form of a piezoelectric element, and lead-out lines 5a and 5b are connected with electrode terminals thereof. The sensor 4 in the form of the piezoelectric element is of a type, in which when a load is applied from outside thereto, a voltage is generated and the voltage corresponding to the load can be obtained between the lead-out lines 5a and 5b as a detected preload amount signal. The adequateness of the amount of preload can be displayed by a preload amount determining unit 30 to which the voltage generated by the sensor 4 is applied.

It is to be noted that for the sensor 4 referred to above, a strain gauge may be employed as an alternative to the piezoelectric element.

The inner member 2 includes a hub axle 2A having the wheel mounting flange 2a integral therewith and an inner race 2B and, by crimping an inboard end of the hub axle 2A to form a crimped portion 2b, the both are rendered to be combined together integrally. Of the double rows of the rolling surfaces 8 and 9, the rolling surface 8 is formed in the hub axle 2A and the other rolling surface 9 is formed in the inner race 2B. Since the hub axle 2A is for the driven wheel, it is of a shape having no center hole.

The operation of the above described construction will be described. The sensor 4 in the form of the piezoelectric element is sandwiched between the outer member body 1A and the outer race 1B and, as the axially acting load acts on the outer race 1B, the load acts on the sensor 4, too. The waveform of the voltage generated in the sensor 4 in the form of the piezoelectric element at this time is shown in FIG. 2. Referring to FIG. 2, a portion of the chart on a left side of the center, at which the peak of the waveform appears, represents a positive component of a change of the preloaded load, while another portion of the chart on a right side of the center represents a discharge of the charge accumulated on the sensor 4 in the form of the piezoelectric element. Accordingly, the value obtained by integrating a hatched area shown on the left side of the peak of the voltage waveform corresponds to the amount of preload of the bearing. Accordingly, by controlling the integrated amount, an uniform amount of initial preload can be applied precisely. Also, even when the amount of preload is detected while the sealing member 11 has already been incorporated, the presence of the sealing member 11 does not adversely affect the detection precision and, therefore, not only can the assemblage be simplified, but also ingress of the dusts and grits into the bearing is prevented during the application of the preload.

Figure 3:
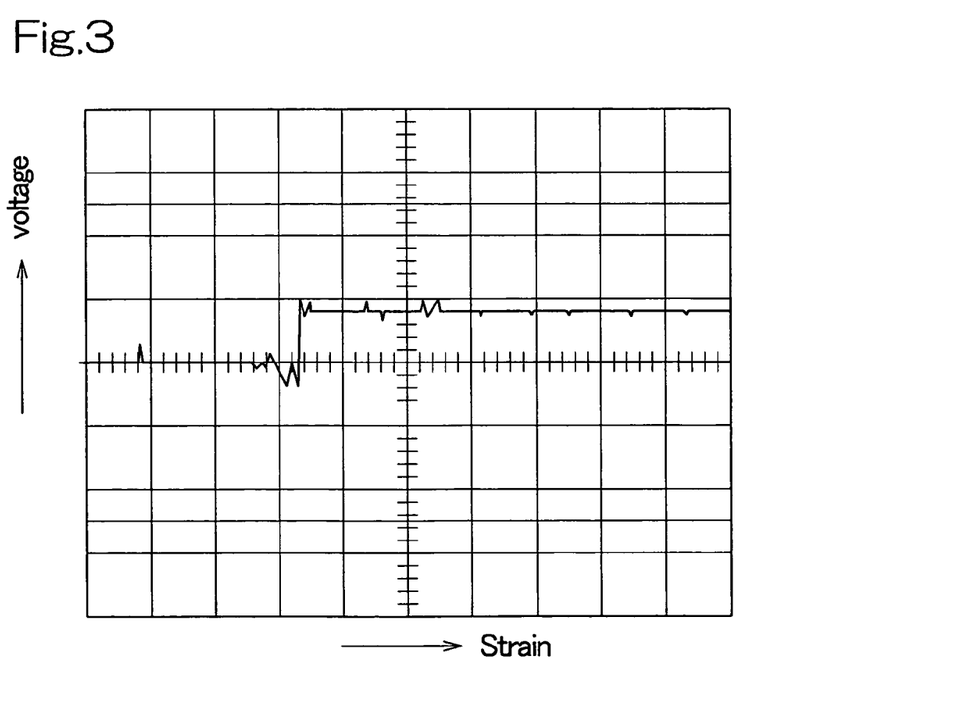
FIG. 3 is a chart showing the waveform of an output voltage of a strain gauge provided in the bearing device for the wheel shown in FIG. 1 as the sensor.

FIG. 3 illustrates the voltage waveform obtained when a strain gauge is used for the sensor 4 and the load acts on such strain gauge. FIG. 3 makes it clear that as the load acting on the sensor 4 in the form of the strain gauge increase, the voltage generated by the sensor 4 change stepwise. In view of this, in such case, by controlling a potential difference of the stepwise changing voltage generated by the sensor 4, the amount of preload of the bearing can be precisely set.

Figure 4:
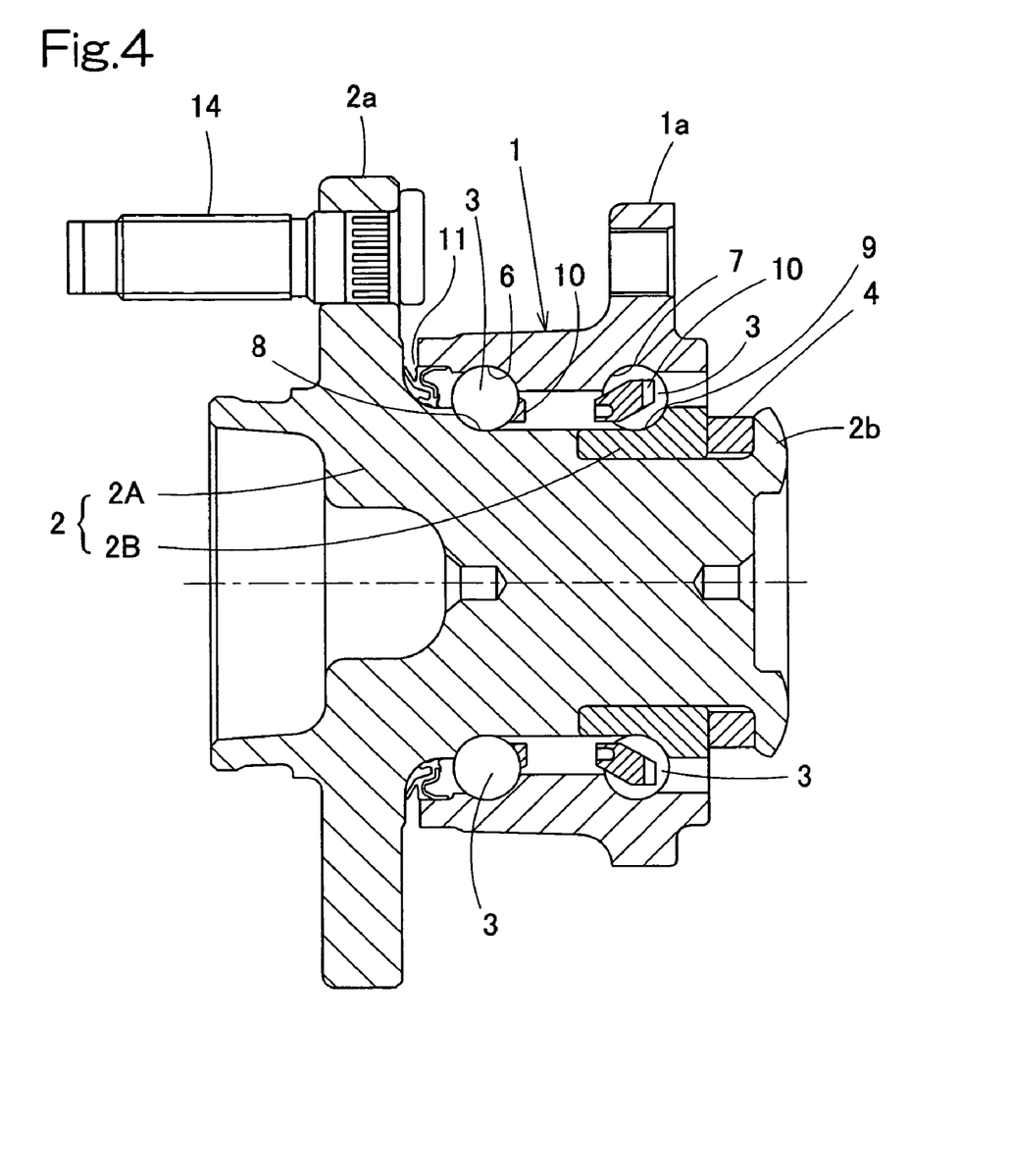
FIG. 4 is a longitudinal sectional view of the bearing device for the wheel according to a second preferred embodiment of the present invention.

FIG. 4 illustrates a second preferred embodiment of the present invention. This embodiment is such that in the first embodiment shown in FIG. 1, the outer member 1 is rendered to be an independent member and the sensor 4 is provided in the inner member 2. The inner member 2 is, as is the case with that in the first embodiment, made up of the hub axle 2A, and the inner race 2B. The ring-shaped sensor 4 in the form of, for example, the piezoelectric element, is disposed between the crimped portion 2b, formed in the inboard end of the hub axle 2A, and an end face of the inner race 2B opposed to the crimped portion 2b. By crimping to form the crimped portion 2b, the inner race 2B and the sensor 4 are axially positioned and fixed to the hub axle 2A with the sensor 4 sandwiched between the inner race 2B and the crimped portion 2b.

Other structural features are similar to those in the first embodiment.

In the case of this construction, since the crimping work to apply the preload to the bearing is accompanied by change in output voltage of the sensor 4 in the form of the piezoelectric element, the amount of preload of the bearing can be precisely set by controlling this output voltage. Also, since the crimping work to form the crimped portion 2b concurrently serves as the work to apply the preload, no extra work other than the assemblage of the bearing is required solely for the application of preload, resulting in simplification of the work. Even in the case where the strain gauge is used for the sensor 4, the amount of preload can be precisely set in a manner similar to that described above.

Figure 5:
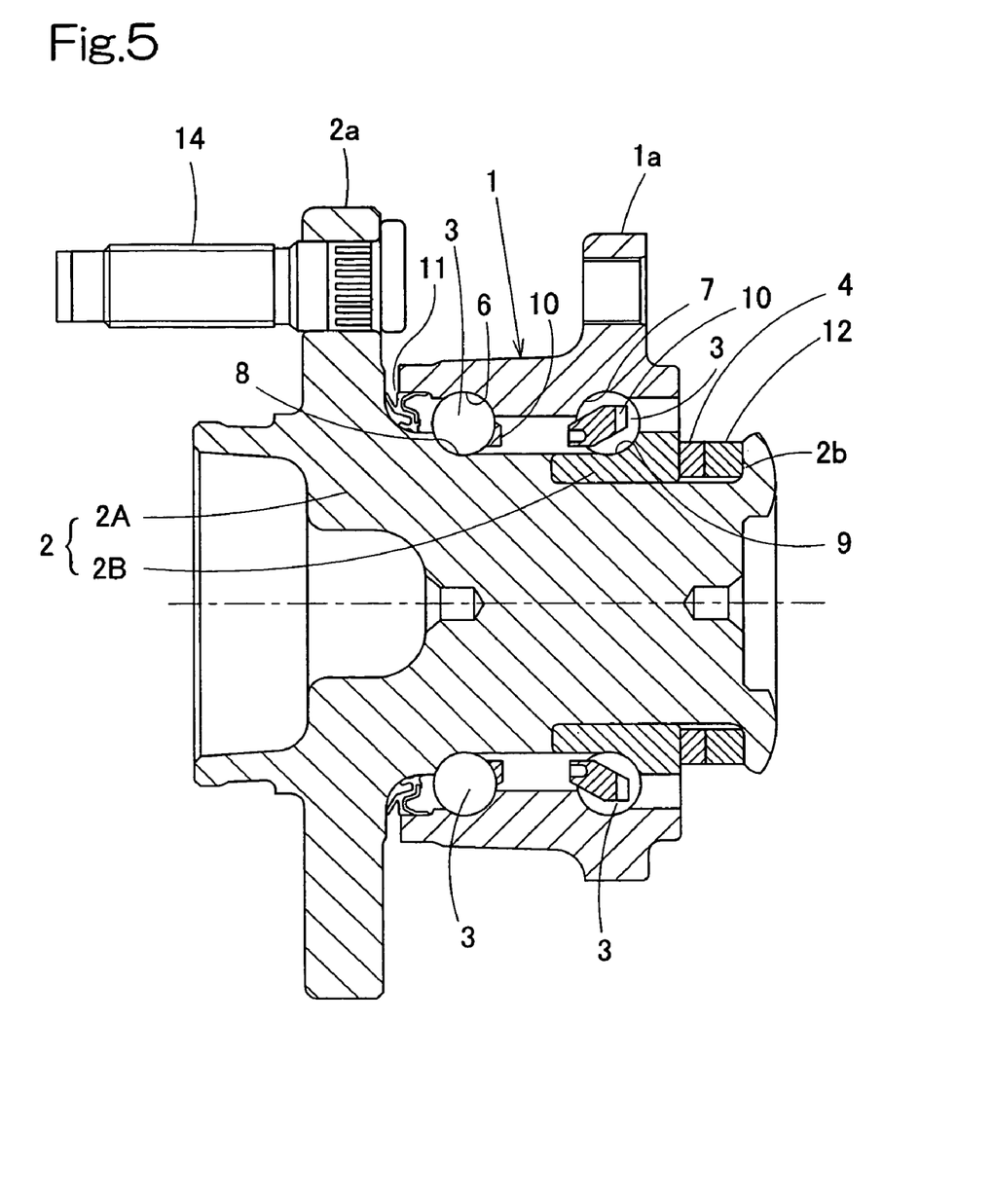
FIG. 5 is a longitudinal sectional view of the bearing device for the wheel according to a third preferred embodiment of the present invention.

FIG. 5 illustrates a third preferred embodiment of the present invention. This embodiment is such that in the second embodiment shown in FIG. 4, a spacer 12 is interposed between the sensor 4 and the crimped portion 2b of the hub axle 2A. In other words, the inner race 2B, the sensor 4, the spacer 12 and the crimped portion 2b are sequentially arranged in this order from the inner race 2B to the crimped portion 2b. Other structural features are similar to those in the second embodiment shown in FIG. 4.

Thus, intervention of the spacer 12 is effective to allow a uniform load to be applied to the sensor 4 in the form of the piezoelectric element during the application of preload, facilitating an further accurate preload control.

Figure 6:
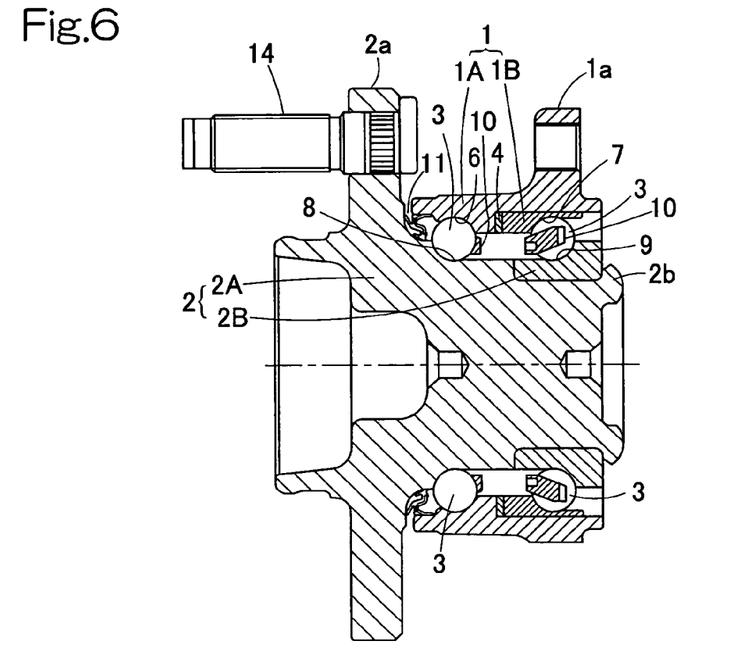
FIG. 6 is a longitudinal sectional view of the bearing device for the wheel according to a fourth preferred embodiment of the present invention.
Figure 7:
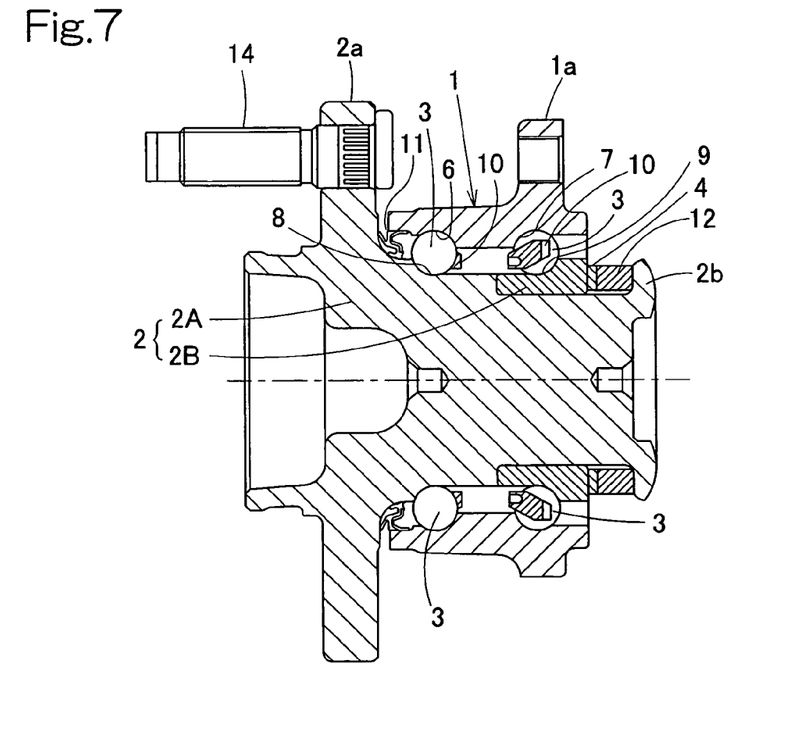
FIG. 7 is a longitudinal sectional view of the bearing device for the wheel according to a fifth preferred embodiment of the present invention.

FIGS. 6 and 7 illustrates fourth and fifth preferred embodiments of the present invention. The fourth embodiment shown in FIG. 6 is such that in the first embodiment shown in FIG. 1, in place of the use of the sensor 4 and the outer member 1, which are separate from each other, there is shown an example, in which the sensor 4 is comprised of a thin film printed directly on the outer race 1B or the outer member body 1A by means of a printing technique. This thin film is, for example, a strain gauge having printed wirings. The fifth embodiment shown in FIG. 7 is such that in the third embodiment shown in FIG. 5, in place of the use of the separate sensor 4, there is shown an example, in which the sensor 4 is comprised of a thin film printed directly on the inner race 2B or the spacer 12 by means of a printing technique.

If the sensor 4 is comprised of the thin film formed directly on the outer member 1 or the inner member 2 by means of the printing technique such as in those embodiments, no work of fitting the sensor 4 is required, assemblage of the bearing can be facilitated and the sensor can be provided at a low price.

Figure 8:
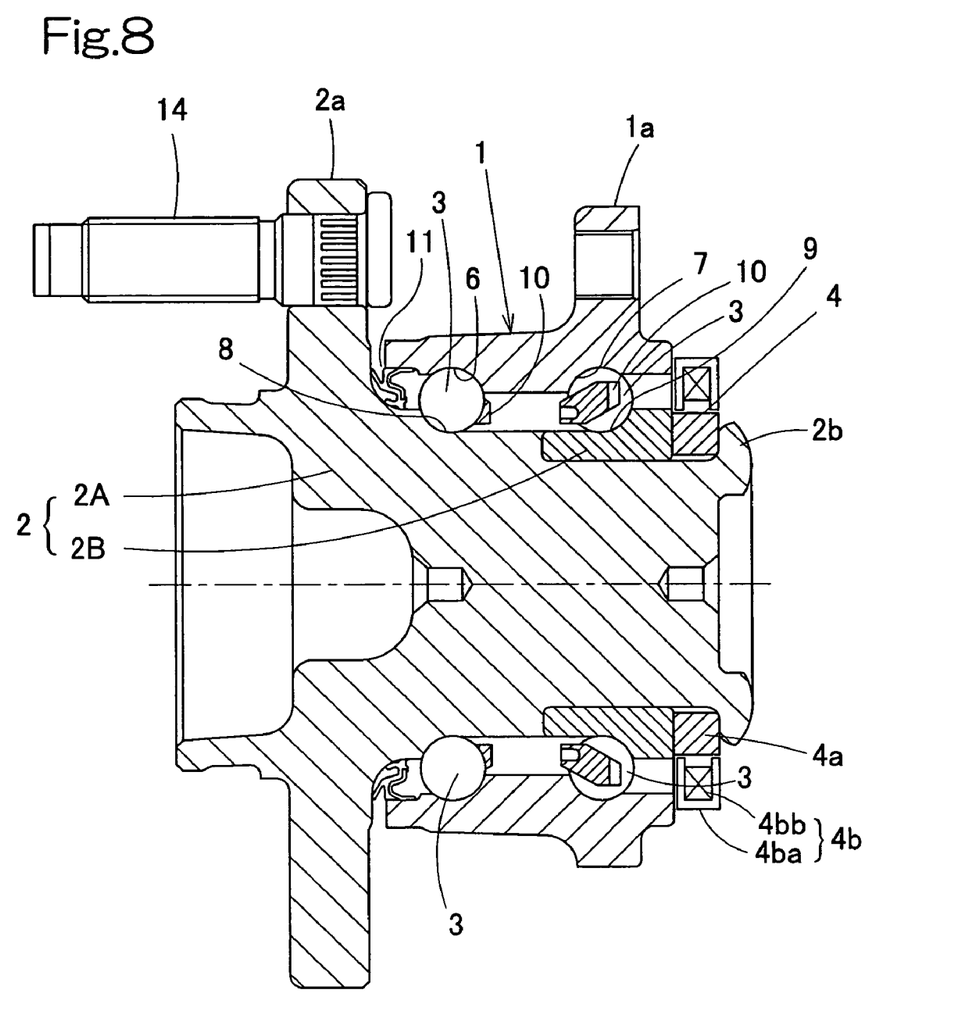
FIG. 8 is a longitudinal sectional view of the bearing device for the wheel according to a sixth preferred embodiment of the present invention.

Although in any one of the foregoing embodiments the examples have been described, in which as the sensor 4 for detecting the amount of preload the piezoelectric element or the strain gauge is employed, any other element may be employed, provided that it can detect the load. By way of example, a magnetostrictive element may be employed as the sensor 4. This example is shown in the sixth embodiment of FIG. 8. In this example, the sensor 4 is in the form of a ring-shaped detector 4b made up of a ring-shaped magnetostrictive material 4a, a yoke 4ba and a coil 4bb, with the magnetostrictive material 4a interposed between the inner race 2B and the crimped portion 2b. The detector 4b is fitted to one end of the inner race 2B. If during the crimping, the magnetostrictive material 4a, of which magnetic permeability changes with the preload, is taken as a target and detection is then made with the detector 4b having the coil 4bb referred to above, the preload can be controlled.

Also, in any one of the foregoing embodiments, the shape of the sensor 4 may not be limited to a plate shape or a thin film shape, but may be, for example, a pipe-like shape. Also, the sensor 4 may not be limited to the ring shape, but may be of a type locally provided at, for example, a plurality of locations in a circumferential direction.

Also, although any one of the foregoing embodiments has been described as applied to the bearing device of the third generation type, the present invention can be equally applied regardless of the particular generation type. By way of example, in the embodiment shown in FIG. 1, it may be rendered to be a bearing device for a wheel of a second generation type, in which a plurality of inner races (not shown) are provided on the hub axle 2A.

FIGS. 9 to 12 illustrate a seventh preferred embodiment of the present invention. This wheel support bearing assembly is of an inner race rotating type and includes an outer member 1 having an inner periphery formed with double rows of rolling surfaces 6 and 7, an inner member 2 having rolling surfaces 8 and 9 opposed to the rolling surfaces 6 and 7 and double rows of rolling elements 3 interposed between the double rows of rolling surfaces 6 to 9. This wheel support bearing assembly is rendered to be a double row angular contact ball bearing and the rolling surfaces 6 to 9 represent an arcuate sectional shape with their contact angles held in back-to-back relation with each other. The rolling elements 3 are in the form of a ball and are retained by a retainer 10 employed for each row. At a location outside of the row of the rolling elements 3 on the outboard side, an annular space delimited between the outer member 1 and the inner member 2 are sealed by a sealing member 11. The outer member 1 is fitted at one end to a knuckle (not shown) of a vehicle body through a vehicle body installation flange 1a.

Figure 9:
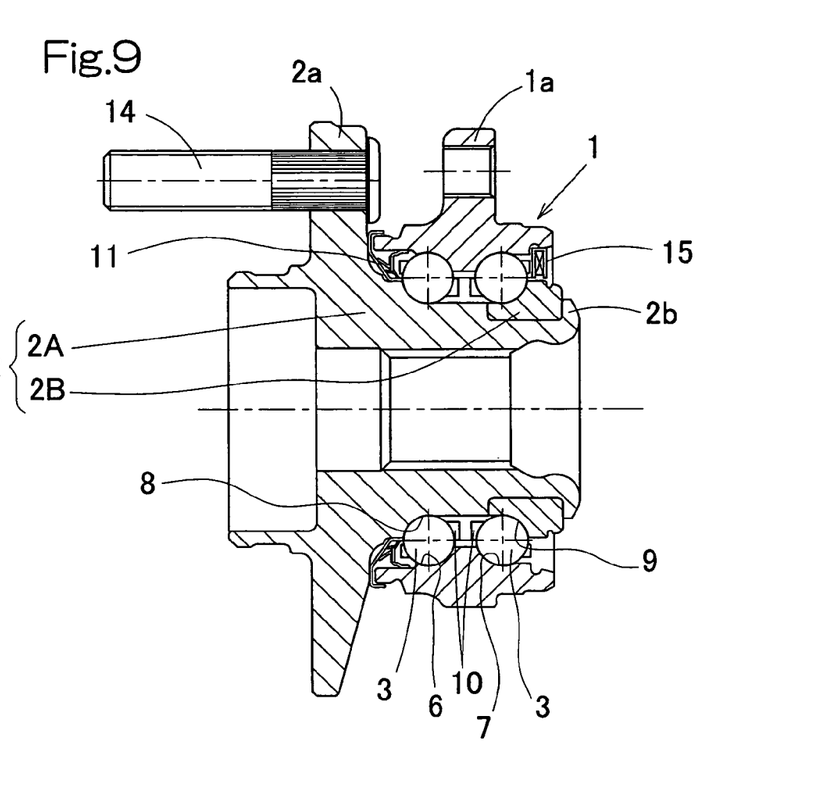
FIG. 9 is a longitudinal sectional view of the bearing device for the wheel according to a seventh preferred embodiment of the present invention.

The inner member 2 includes a hub axle 2A having a wheel mounting flange 2a integral therewith and an inner race 2B press-fitted onto an outer periphery of an inboard end portion of the hub axle 2A and, by crimping an inboard end of the hub axle 2A to form a crimped portion 2b, the both are rendered to be combined together. Of the double rows of the rolling surfaces 8 and 9, the rolling surface 8 is formed in the hub axle 2A and the other rolling surface 9 is formed in the inner race 2B.

Figure 10:
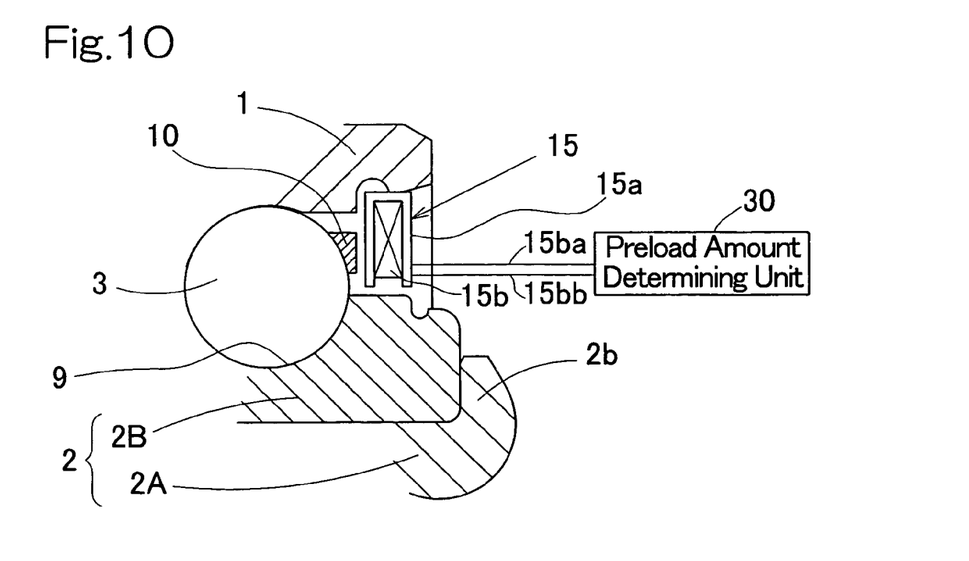
FIG. 10 is an enlarged sectional view showing a portion of FIG. 9 shown on an enlarged scale.

As shown in FIG. 10 on an enlarged scale, the outer member 1 has an inner diametric surface arranged with a winding type sensor 15 made up of a yoke 15a and a coil 15b. The sensor 15 has an inner diametric surface held in proximity of an outer diametric surface of the inner race 2B. This sensor 15 may be either of an annular shape or for a portion of the outer member 1 in a circumferential direction. The sensor 15 is used for controlling the amount of crimping performed to fix the inner race 2B by means of the crimped portion 2b of the hub axle 2A.

Figure 11A:
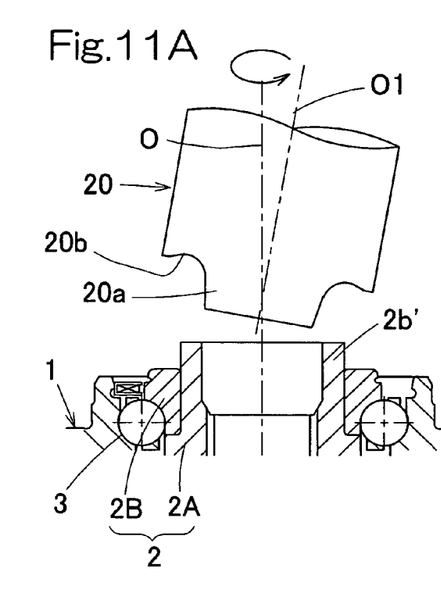
FIG. 11A illustrates the manner of fixing an inner race to a hub axle by means of a orbital forging technique, showing a condition before an inboard end of the hub axle is crimped.
Figure 11B:
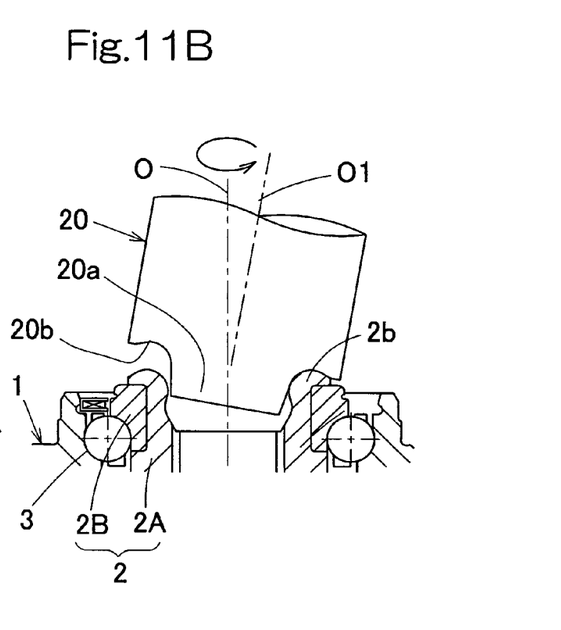
FIG. 11B illustrates the manner of fixing an inner race to a hub axle by means of a orbital forging technique, showing a condition after an inboard end of the hub axle has been crimped.

As shown in FIG. 11A showing a condition before the inboard end of the hub axle is crimped and FIG. 11B showing a condition after the inboard end of the hub axle has been crimped, an orbital forging is a method, in which a cylindrical protrusion 2b' protruding axially outwardly from the inboard end of the hub axle 2A is expanded in diameter by a forging die 20 then moving along an orbital path. The forging die 20 includes a reduced diameter end 20a engageable in the cylindrical protrusion 2b' and a shoulder 20b engageable with an annular free end of the cylindrical protrusion 2b' and is tiltedly rotated so that the longitudinal axis O1 of the forging die 20 can depict a conical shape about the longitudinal axis O of the bearing assembly to apply an orbital forging to the annular free end of the cylindrical protrusion 2b' through the shoulder 20b to thereby expand the annular free end of the cylindrical protrusion 2b' radially outwardly as best shown in FIG. 11B.

Hereinafter, the assembling method, which forms an embodiment of the present invention, will be described in detail. When while the sensor 15 has been disposed in the inner diametric surface of the outer member 1 in the manner described above, the orbital forging is carried out to form the crimped portion 2b, the inner race 2B expands in a radial direction in proportion to the amount of crimping and, at the same time, a hoop stress develops. Accordingly, when the winding type sensor 15 is disposed and an electric current is subsequently supplied across the coil 15b, this amount of change is represented by a change (decrease) of the magnetoresistance and, therefore, the preload can be controlled relying on an output from the sensor 15. In other words, the output from the sensor 15 is fed to the preload amount detector 30 through the lead-out lines 15ba and 15bb and the adequateness of the amount of the preload can be displayed by this detector 30.

This assembling method is a method, in which during the orbital forging being effected, the signal from the sensor 15 is continuously or discretely processed and the orbital forging is terminated at the moment a preset target signal value is attained.

By applying a bearing preload by means of the orbital forging while the output from the sensor 15 is monitored, variation of the amount of preload of the bearing can be eliminated, the bearing rigidity and the rotational torque of the individual bearing can be rendered constant, and the quality can therefore be stabilized.

Considering that dimensional measurement of individual component parts involves errors, the amount of preload at the time the inner race 2B is press-fitted onto the hub axle 2A changes considerably as the errors accumulates. Also, the change in amount of preload applied as a result of the orbital forging has a variation. Accordingly, in order to prevent the variation in preload during the press-fitting from being left over to the subsequent process step, measurement of both the bearing rigidity and the starting torque or the natural frequency is carried out after the press-fitting and any deviation from the target value is fed back to the amount of orbital forging. By so doing, variation of the amount of preload resulting from the press-fitting can be counterbalanced.

Since the sensor 15 is inserted in a location where the seal is incorporated in the final product, there is no need to secure a special space for the sensor 15 and it is indeed convenient.

Figure 12:
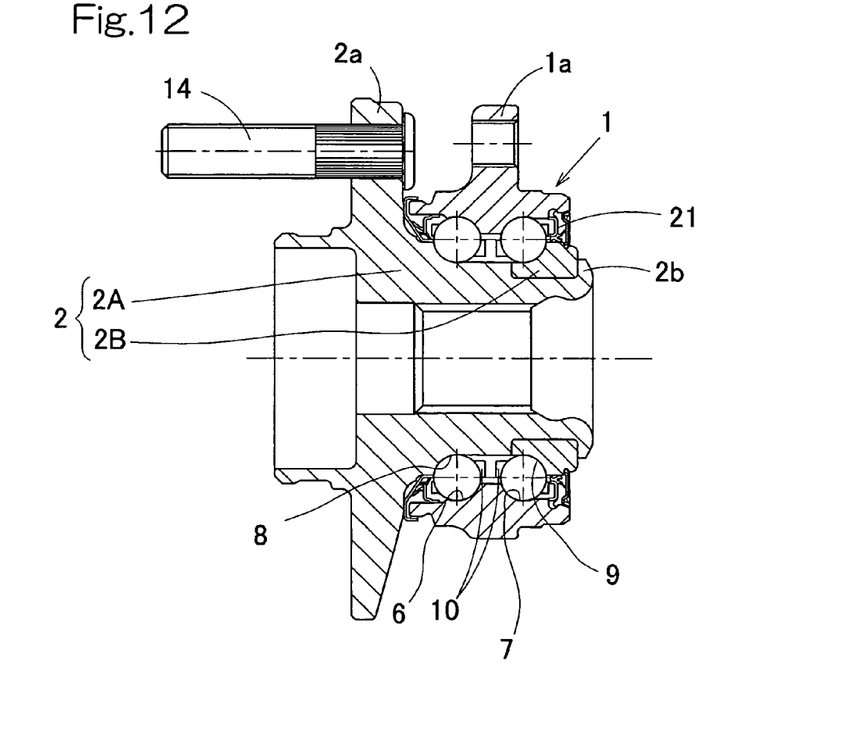
FIG. 12 is a longitudinal sectional view showing a condition of the final product of the bearing device for the wheel.

In the final product, as shown in FIG. 12, a seal 21 is incorporated in an inboard end portion of the annular space delimited between the outer member 1 and the inner member 2 and once occupied by the sensor 15.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A bearing device for a wheel used for rotatably supporting a vehicle wheel relative to a vehicle body, comprising:
   an outer member having an inner peripheral surface formed with a plurality of rows of rolling surfaces;
   an inner member formed with rolling surfaces opposed to the rolling surfaces of the outer member; and
   a plurality of rows of rolling elements interposed between the opposed rolling surfaces,
   wherein either the outer member or the inner member is provided with a sensor to detect the amount of preload in the bearing.

2. The bearing device for the wheel as claimed in claim 1, wherein the sensor to detect the amount of the preload of the bearing is a piezoelectric element.

3. The bearing device for the wheel as claimed in claim 1, wherein the sensor to detect the amount of the preload of the bearing is a strain gauge.

4. The bearing device for the wheel as claimed in claim 1, wherein the sensor to detect the amount of the preload of the bearing is a magnetostrictive element.

5. The bearing device for the wheel as claimed in claim 1, wherein the sensor to detect the amount of the preload of the bearing comprises a thin film printed directly on a member of one of the outer and inner members.

6. The bearing device for the wheel as claimed in claim 1, wherein the inner member includes a hub axle and an inner race mounted on an outer periphery of the hub axle, and
   the inner race is fixed on the hub axle by means of a crimped portion formed by crimping an inboard end of the hub axle and the preload of the bearing is applied by this crimping to form the crimped portion.

7. The bearing device for the wheel as claimed in claim 1, wherein the bearing device is assembled to attain a predetermined preload by utilization of the signal from the sensor.

8. The bearing device for the wheel as claimed in claim 1, wherein the inner member includes a hub axle and an inner race mounted on an outer periphery of the hub axle, the inner race being fixed on the hub axle by means of a crimped portion formed by crimping an inboard end of the hub axle,
   wherein the preload of the bearing is applied as a result of the crimping to form the crimped portion, and
   the sensor to detect the amount of preload of the bearing is fitted to the outer member and comprises a winding type coil capable of detecting one or both of an amount of radial displacement of an outer diametric surface of the inner race and a change of a magnetoresistance resulting from a stress acting on the inner race.

9. The bearing device for the wheel as claimed in claim 8, wherein the sensor is removably fitted to the outer member and this sensor is fitted to the outer member during assemblage of the bearing assembly, but is removed from the outer member during use of the bearing assembly.

10. A method of assembling a bearing device for a wheel as recited in claim 8, the method comprising crimping to form the crimped portion,
    wherein crimping of the inboard end of the hub axle is carried out by means of orbital forging, and
    the signal from the sensor is continuously or discretely processed and the orbital forging is terminated at the moment a preset target signal value is attained.

11. The method of assembling the bearing device for the wheel as claimed in claim 10, wherein after a press-fitting of the inner race onto the hub axle, but before the crimping being effected, a starting torque, a natural frequency or a rigidity of the bearing device for the wheel is measured and, based on this measurement, the preset target signal value for the crimping is determined.

* * * * *